Sept 17, 1957   J. T. PERTILE   2,806,347

INTERNAL COMBUSTION ENGINE EXHAUST SYSTEM

Filed June 11, 1956

INVENTOR.
J.T. PERTILE
BY George Stell
AGENT

United States Patent Office 2,806,347
Patented Sept. 17, 1957

2,806,347
INTERNAL COMBUSTION ENGINE EXHAUST SYSTEM

John T. Pertile, North Kansas City, Mo.

Application June 11, 1956, Serial No. 590,738

1 Claim. (Cl. 60—30)

This invention relates to an exhaust system for an internal combustion engine and more particularly to an exhaust system arranged to eliminate exhaust back pressure at the engine exhaust ports and to substantially reduce the amount of combustible gases released to the atmosphere with the engine exhaust.

The exhaust system of an internal combustion engine, particularly of the engines used in vehicles such as automobiles, trucks and the like, generally consists of an exhaust collector having inlets communicating with the exhaust ports of the engine and an outlet having a discharge conduit connected thereto. Intermediate the ends of the discharge conduit is positioned an exhaust silencer or muffler through which the exhaust passes prior to being discharged into the atmosphere. The muffler reduces the engine exhaust noise by breaking up and diverting the exhaust stream as the exhaust passes therethrough with the result that the flow of exhaust is sufficiently restricted to create a pressure in the exhaust collector and in the exhaust discharge conduit between the muffler and the collector. This back pressure into which the engine must discharge its exhaust prevents the engine from operating at its maximum efficiency and results in increased fuel consumption, loss of power and, in many instances, causes the engine to operate at excessively high temperatures.

It is, therefore, a primary object of this invention to provide an exhaust system for an internal combustion engine in which the exhaust is withdrawn from the exhaust collector and expelled out through the discharge conduit at a rate which will relieve the engine from all exhaust back pressure.

The exhaust gases discharged by an internal combustion engine generally contain combustible gases, such as hydro-carbons, due to incomplete burning of the engine fuel in the engine. The release of these gases to the atmosphere contributes greatly to the pollution of the air particularly in heavily populated areas where a great many trucks, automobiles and the like are operated.

Another object of this invention is, therefore, to promote further burning of the combustible gases contained in the engine exhaust prior to the discharge of the exhaust to the atmosphere.

A further object is to provide means for accomplishing the foregoing objects which may be easily installed on an internal combustion engine and which is of relatively simple and inexpensive construction.

These and other objects and advantages will become apparent as the discription of the invention proceeds.

For a better understanding of the invention reference is made to the accompanying drawing illustrating a preferred embodiment thereof and in which Fig. 1 is a somewhat schematic view, partially in section, of an internal combustion engine exhaust system embodying the invention;

Figure 1:
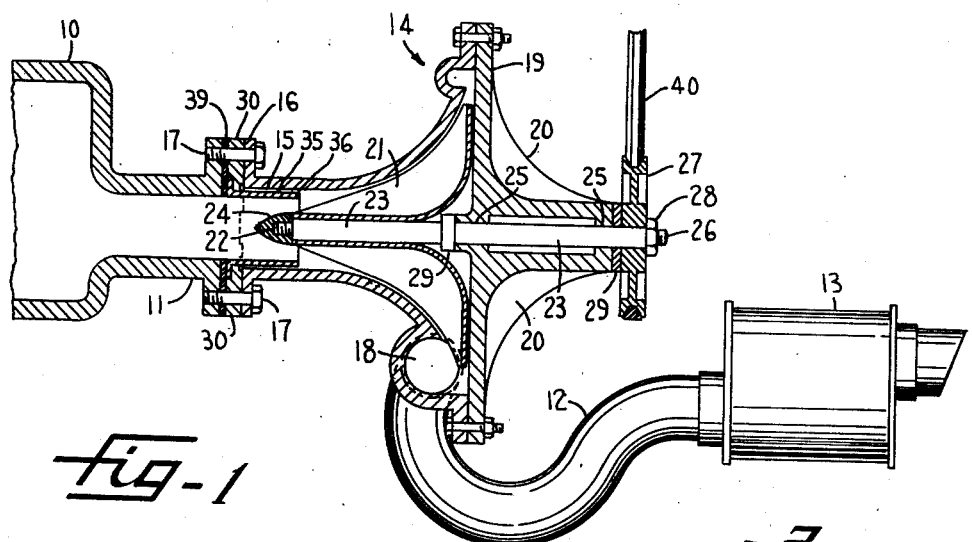
Figure 3:
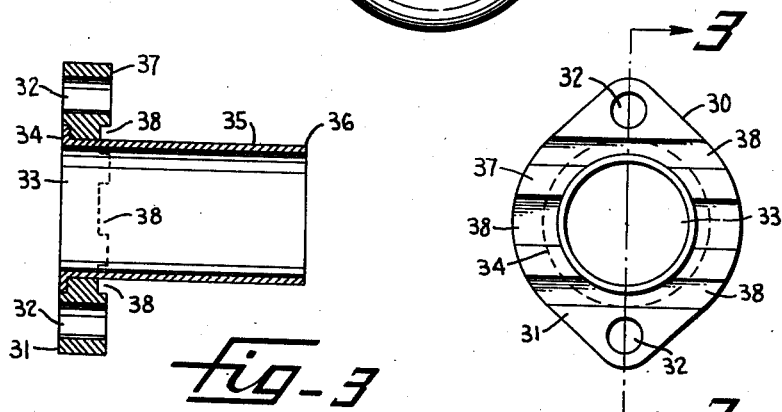
Fig. 3 is a sectional view of Fig. 2 taken on line 3—3.
Figure 2:
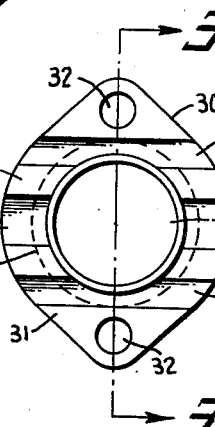
Fig. 2 is an end view of a means for admitting air into the exhaust stream.

With reference to Fig. 1 of the drawing wherein is shown a portion of an exhaust collector 10 of a known type arranged to receive the exhaust discharged by an internal combustion engine (not shown) and which is provided with a flanged outlet 11 through which the exhaust passes into a discharge conduit 12 provided with an exhaust muffler 13. Interposed between conduit 12 and outlet 11 is a suction blower 14 having an inlet 15 provided with a flange 16 adapted for connection to flanged outlet 11 by means of bolts 17 and having an outlet 18 connected to conduit 12. Blower 14 comprises a casing 19 provided with reinforcing webs 20 and containing a vaned rotor 21 secured to the threaded end 22 of a shaft 23 by means of a nut 24. Shaft 23 is rotatably supported in casing 19 by bearings 25 and has a projecting threaded end 26 extending out through casing 19 on which a drive pulley 27 is secured by means of a nut 28. Shaft 23 is also provided with thrust bearings 29 which prevent any endwise movement of shaft 23 in bearings 25. Interposed between flanged outlet 11 and flange 16 of blower inlet 15 is an air intake 30 having a flange 31 shaped similar to flange 16 and provided with openings 32 through which bolts 17 pass to secure flange 31 in position between flange 16 and flanged outlet 11. Flange 31 is provided with a central opening 33 passing therethrough in which the end 34 of a tube 35 is secured as shown in Fig. 3 of the drawing. The outer diameter of tube 35 is slightly smaller than the inner diameter of inlet 15 and its extending end 36 is positioned adjacent rotor 21 of blower 14. The face 37 of flange 31 in engagement with flange 16 is provided with grooves 38 extending from tube 35 out through the periphery of flange 31 and a gasket 39 is interposed between flange 31 and flanged outlet 11 of collector 10. Pulley 27 is adapted to be driven by a V belt 40 which extends to one of the rotating parts of the engine such as an extension of the cam shaft or the end of the crankshaft (not shown) so that shaft 23 and rotor 21 are rotated at speeds which vary with the speed of the engine.

In operation blower 14 has a transmission capacity greater than necessary to withdraw all of the engine exhaust from collector 11 at all engine speeds so that when the engine is operating the exhaust is withdrawn very rapidly from collector 10 and expelled through conduit 12 and muffler 13 to prevent any accumulation of exhaust from creating a back pressure in the collector. The rapidly moving exhaust stream passing through outlet 11 and inlet 15 passes through tube 35 which, being of smaller diameter than inlet 15, increases the velocity of the exhaust stream with a corresponding decrease in pressure in this area in a manner similar to the action of a venturi tube. The decrease in pressure causes a slight vacuum to be created in the area between the outer surface of tube 35 and the inner surface of inlet 15 so that air from the ambient atmosphere is drawn in through grooves 38 in flange 31 to mix with the exhaust. The air drawn into the exhaust stream from the atmosphere contains sufficient oxygen so that as it enters the exhaust stream immediately at the outlet of collector 10 where the exhaust is still very hot, the combustible gases in the exhaust are ignited and at least partially burned before the exhaust is discharged to the atmosphere.

Figure 4:
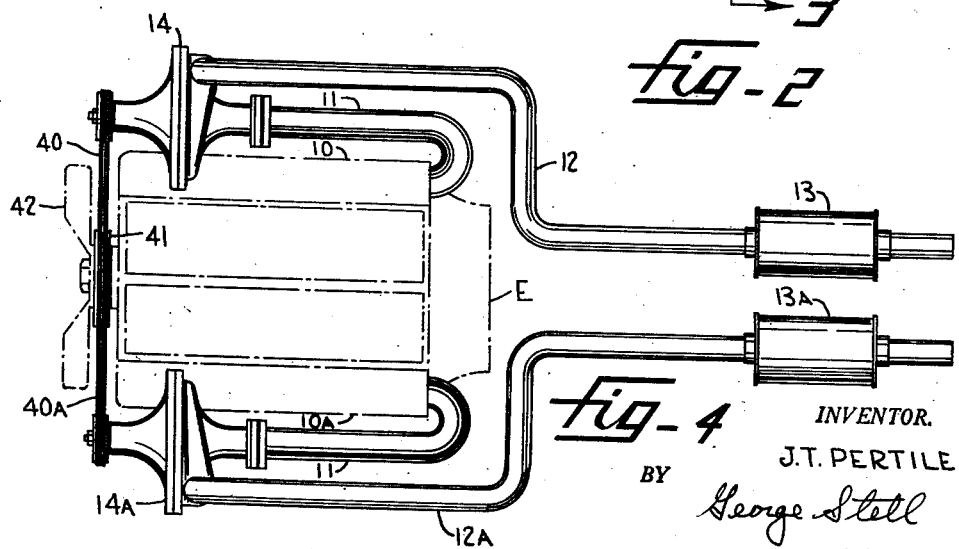
Fig. 4 is a schematic plan view of a V type internal combustion engine having a dual exhaust system each of which is constructed in accordance with the present invention.

In Fig. 4 of the drawing a V type engine E is schematically shown which is provided with a dual exhaust system in which corresponding parts are identified by the same numbers with the addition of the suffix *a*. Engine E is provided with exhaust collectors 10 and 10ª which are connected to exhaust discharge conduits 12 and 12ª respectively. Interposed between collectors 10 and 10ª and conduits 12 and 12ª are blowers 14 and 14ª as previously described. Blowers 14 and 14ª are actuated by belts 40 and 40ª respectively which extend to the drive unit 41 with which the fan 42 is also actuated making a simple and easily installed installation of the blowers.

The above described invention serves a dual purpose, it improves and increases the efficiency of an internal combustion engine by relieving the engine of all exhaust back pressure and prevents an excessive amount of noxious and harmful gases from being released to the atmosphere with the exhaust by promoting further combustion of the combustible gases in the engine exhaust.

This invention may be embodied in other forms or carried out in other ways without departing from the spirit or essential characteristics thereof. The present embodiment of the invention being illustrative and not restrictive, the scope of the invention is indicated in the appended claims.

Having thus described my invention, what I claim as new and desire to secure by Letters Patent is:

An internal combustion engine exhaust system comprising, in combination: An exhaust gas collector connected to said engine and arranged to receive the exhaust gas discharged thereby, said collector being provided with a flanged exhaust gas outlet; an exhaust discharge conduit; a blower having its outlet connected to said discharge conduit, said blower having a flanged inlet disposed adjacent the flanged outlet of said collector; a tube disposed within said blower inlet and spaced away from the inner wall thereof; a flange connected to the upstream end of said tube and extending out between said flanged blower inlet and said flanged collector outlet, said flange being provided with a plurality of grooves extending from the outer surface of said tube out through the edges of said flange; means for securing said flange between and in close contact with said flanged blower inlet and said flanged collector outlet; and means for actuating said blower to withdraw exhaust gas from within said collector and to draw air from the ambient atmosphere through said grooves into the exhaust stream.

References Cited in the file of this patent
UNITED STATES PATENTS

| | | |
|---|---|---|
| 1,226,789 | Macomber | May 22, 1917 |
| 2,402,087 | Rosales | June 11, 1946 |
| 2,708,824 | Engstrom | May 24, 1955 |